United States Patent [19]

Heller et al.

[11] Patent Number: 5,641,341

[45] Date of Patent: Jun. 24, 1997

[54] METHOD FOR MINIMIZING THE CLOGGING OF A COOLING ZONE HEAT EXCHANGER IN A REFLOW SOLDER APPARATUS

[75] Inventors: David Heller, Basking Ridge; James Neville, Springfield; Peter J. Griffin, Wayne, all of N.J.

[73] Assignee: Heller Industries, Florham Park, N.J.

[21] Appl. No.: 599,941

[22] Filed: Feb. 14, 1996

[51] Int. Cl.[6] .................................................. B01D 29/56
[52] U.S. Cl. ........................ 95/287; 55/267; 95/288; 165/95; 228/46; 228/200; 228/219
[58] Field of Search ........................... 95/288, 286, 287; 55/267–269, 385.1, 385.5, 385.6, 486, 350.1; 228/46, 200, 201, 219, 222; 219/388, 400; 165/95, 138; 427/398.1, 398.3, 398.4; 118/608, 610

[56] References Cited

U.S. PATENT DOCUMENTS

| | | | |
|---|---|---|---|
| 4,909,430 | 3/1990 | Yokota | 219/388 X |
| 4,938,410 | 7/1990 | Kondo | 219/388 X |
| 5,141,147 | 8/1992 | Yokota | 228/222 X |
| 5,146,325 | 10/1992 | Mishina et al. | 228/219 |
| 5,292,055 | 3/1994 | Gileta | 228/46 |
| 5,333,774 | 8/1994 | Mishina et al. | 228/46 |
| 5,364,007 | 11/1994 | Jacobs et al. | 228/219 X |
| 5,481,087 | 1/1996 | Willemen | 55/267 X |
| 5,526,978 | 6/1996 | Nagatsuka et al. | 228/219 |
| 5,573,174 | 11/1996 | Pekol | 228/219 |
| 5,573,688 | 11/1996 | Chanasyk et al. | 219/400 X |

Primary Examiner—Richard L. Chiesa
Attorney, Agent, or Firm—Patrick J. Piinto

[57] ABSTRACT

A method for minimizing the clogging of a cooling zone heat exchanger of a reflow solder apparatus that includes the steps of: removing a gas/flux mixture from an exhaust zone (20) that is located adjacent a heated zone and/or a cooling zone; conducting the gas/flux mixture to and through a first filter chamber (22), conducting the filtered gas from the filter chamber (22) through a low pressure portion of a blower housing of a cooling zone (16), then subsequently to and through a high pressure portion (44) of the cooling zone that includes a collection tray (38), a mesh filter (48), a heat exchanger (46) and at least one perforated plate (50). The heat exchanger is thermostatically controlled at a preset tempering temperature that minimizes the collection of flux on its exterior surfaces while allowing a solder joint of an article to solidify.

11 Claims, 3 Drawing Sheets

METHOD FOR MINIMIZING THE CLOGGING OF A COOLING ZONE HEAT EXCHANGER IN A REFLOW SOLDER APPARATUS

BACKGROUND OF THE INVENTION

1. Field of the Invention

The present invention generally relates to a process for minimizing the clogging or fouling of a heat exchanger by solder flux in a reflow solder apparatus. And more particularly to the heat exchanger mounted in the cooling zone and used for cooling or solidifying the solder joints of a PC board being processed therein.

2. Description of Related Art

Reflow solder apparatus are well known for producing high quality solder joints between electronic articles and their associated printed circuit (PC) board. In a conventional reflow solder apparatus the soldering of the article to the PC board may be done in a controlled inert atmosphere. This controlled inert atmosphere is generally distributed to the various zones of the apparatus. Heat exchangers are located in the various zones for providing a selective multi-stage heating and/or cooling of the articles being attached to the PC board.

Typically cold tap water may be fed into the cooling zone heat exchanger to provide a rapid setting or solidification of the soldered joint and conservation of an inerting gas.

However, it is necessary to clean the cooling heat exchanger of the known apparatus often, due to clogging of its exterior surface by flux. The known apparatus usually will not operate beyond 100 hours without cleaning. The cleaning, unclogging, or unfouling of the fouled heat exchanger requires that the operation of the apparatus be stopped. In many cases the heat exchanger must be removed from the apparatus and placed in a solvent bath. It can be recognized that for safety purposes, the machine must also be in a cooled state and the controlled atmosphere removed. The down time that is needed for this periodic cleaning of the cooling zone heat exchanger adds to the cost of production. In addition to the cost of accumulated down time, the usage of the inert gas, such as nitrogen, may be increased.

It has been determined that there is a need for a method for minimizing the clogging or fouling of the cooling zone heat exchanger by solder flux. This recognized need should extend the duty cycle of the reflow solder apparatus to at least 700 hours between regular maintenance. It can easily be recognized that by increasing the intervals between regular maintenance, productivity can be increased. This increase in productivity will also aid in the conservation of the inert gas. It is very important that any improvement in the duty cycle not reduce the normal rate of production by extending the time needed for the solder joint to solidify. The present invention solves this desired need and provides other benefits during operation of the reflow apparatus. The present invention may also lend itself to retrofitting existing reflow solder apparatus.

SUMMARY OF THE INVENTION

The present invention may be summarized with regard to its objects. It is an object of the present invention to provide and it does provide a method for minimizing the clogging by flux of the exterior surface of a heat exchanger used in the cooling zone of a reflow apparatus.

It is a another object of this invention to provide and it does provide a method for conserving the use of a inert gas used in a reflow solder apparatus.

It is still another object of the invention to provide and it does provide a method for automatically controlling the temperature of the cooling zone heat exchanger for minimizing flux build up.

One embodiment of the present invention may be briefly described as: a method of minimizing the fouling or clogging, by flux, of an exterior surface of a heat exchanger for cooling a gas of a controlled atmosphere that is interior of a cooling zone of a reflow solder apparatus, comprising: a) removing a gas, containing a flux mixed therein, from the reflow solder apparatus at an exhaust zone adjacent a heated zone and/or a cooling zone by way of a blower and conduit, the blower and conduit being in fluid communication with the exhaust zone; b) separating a major portion of the flux from the gas by conducting the gas from the exhaust zone to and through a first filter chamber; c) conducting the gas leaving the first filter chamber to at least one blower housing of the cooling zone; d) passing the gas leaving each blower housing through at least one aperture of a contoured collection tray, the contoured collection tray being arrayed for collecting any first residual flux condensate thereon, the first residual flux condensate being formed on the walls of the blower housing and dripping therefrom; e) conducting the gas, exiting each aperture of the collection tray, through a second filter; f) tempering the gas exiting from the second filter by passing the gas through a first heat exchanger, the first heat exchanger being maintained at a selected tempering temperature, the tempering temperature simultaneously allowing for the solidification of a soldered joint of an article being transported through the cooling zone of a reflow solder apparatus; and g) passing the gas, that has been tempered by the first heat exchanger, through at least one perforated plate while simultaneously collecting any second residual flux condensate thereon, the second residual condensate forming on the first heat exchanger and dripping therefrom.

The method may also include the additional steps of: (a) selectively contouring the collection tray and the perforated plate for retaining any residual flux thereon; (b) Including a pre-filter and a high efficiency filter interior of the first filter chamber; (c) passing the gas through a mesh filter immediately prior to the heat exchanger; and (d) thermostatically controlling the temperature of the heat exchanger. These steps listed in the paragraphs above, may be used individually or collectively.

In addition to the above summary, the following disclosure is intended to be detailed to insure adequacy and aid in the understanding of the invention. However, this disclosure, showing particular embodiments of the invention, is not intended to describe each new inventive concept that may arise. These specific embodiments have been chosen to show at least one preferred or best mode for the method of the present invention, described herein. These specific embodiments, as shown in the accompanying drawings, may also include diagrammatic symbols for the purpose of illustration and understanding.

Figure 1:
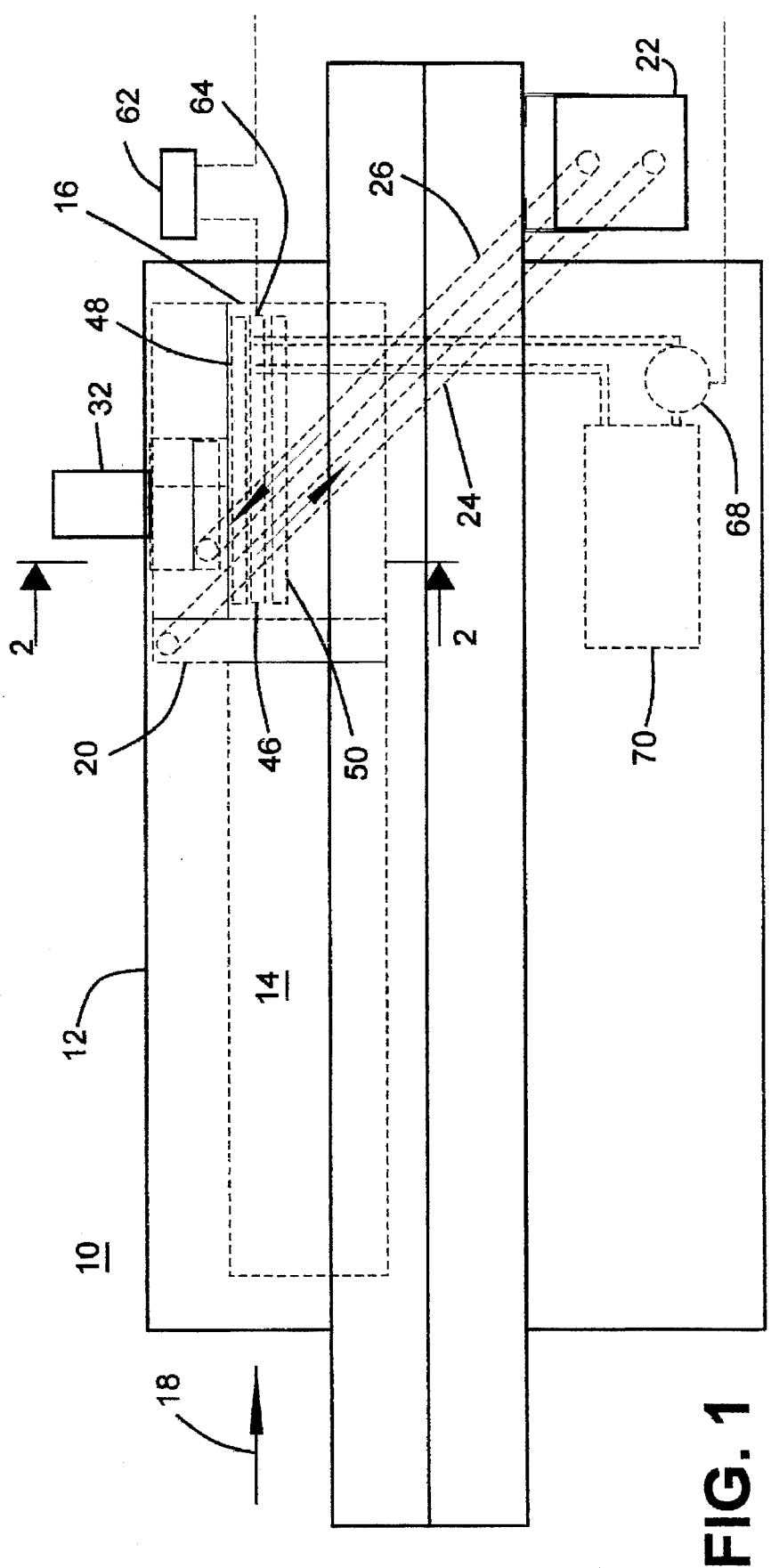
FIG. 1 represents a front elevation of a reflow solder apparatus that employs the method of the present invention, this view being partly schematic.

In the following description and in the appended claims, various details are identified by specific names for convenience. These names are intended to be generic in their application while differentiating between the various details. The corresponding reference numbers refer to like members throughout the several figures of the drawing.

The drawings accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Figure 2:
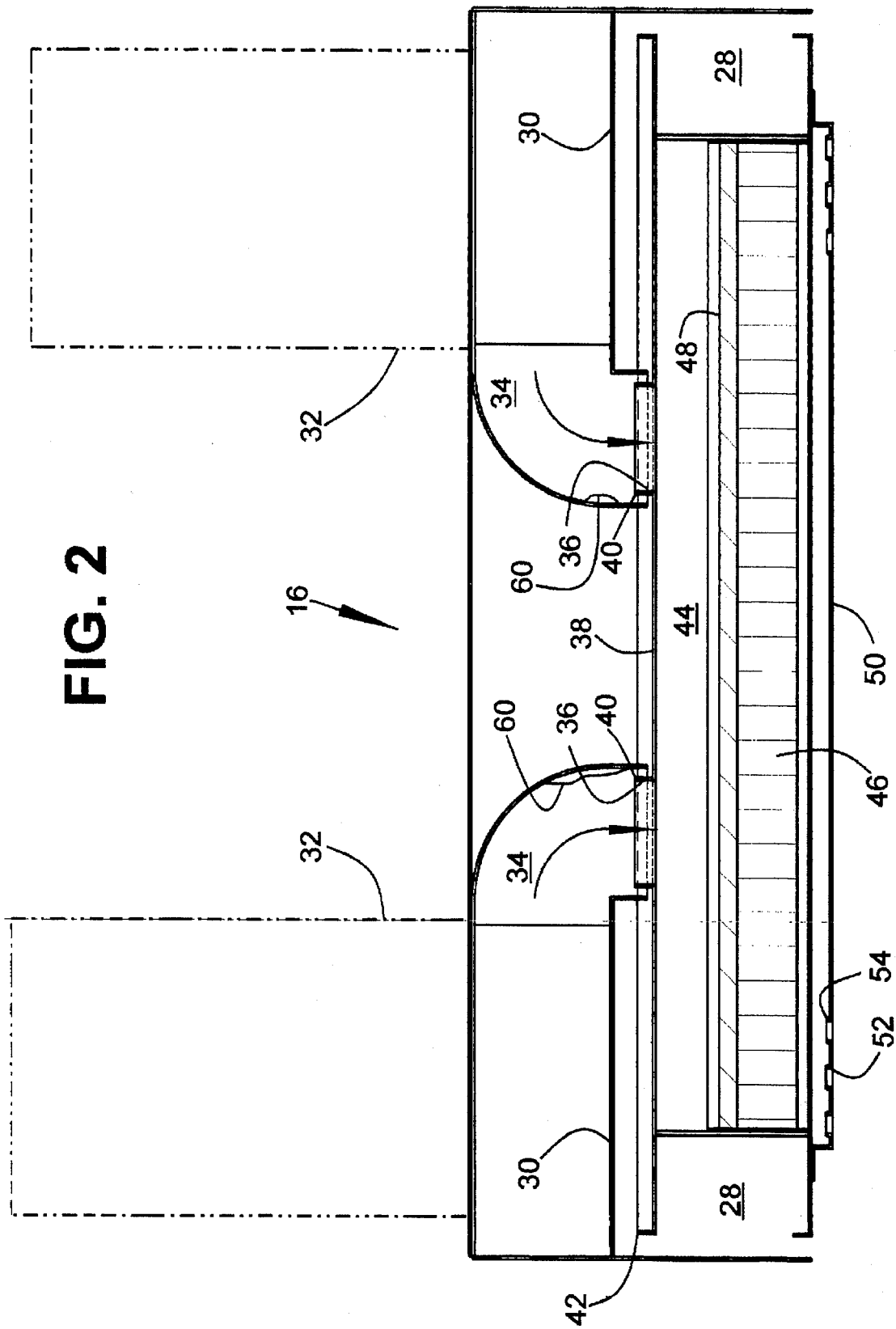
FIG. 2 represents a fragmentary sectional view taken along line 2—2 of FIG. 1, this view also being partly schematic.
Figure 3:
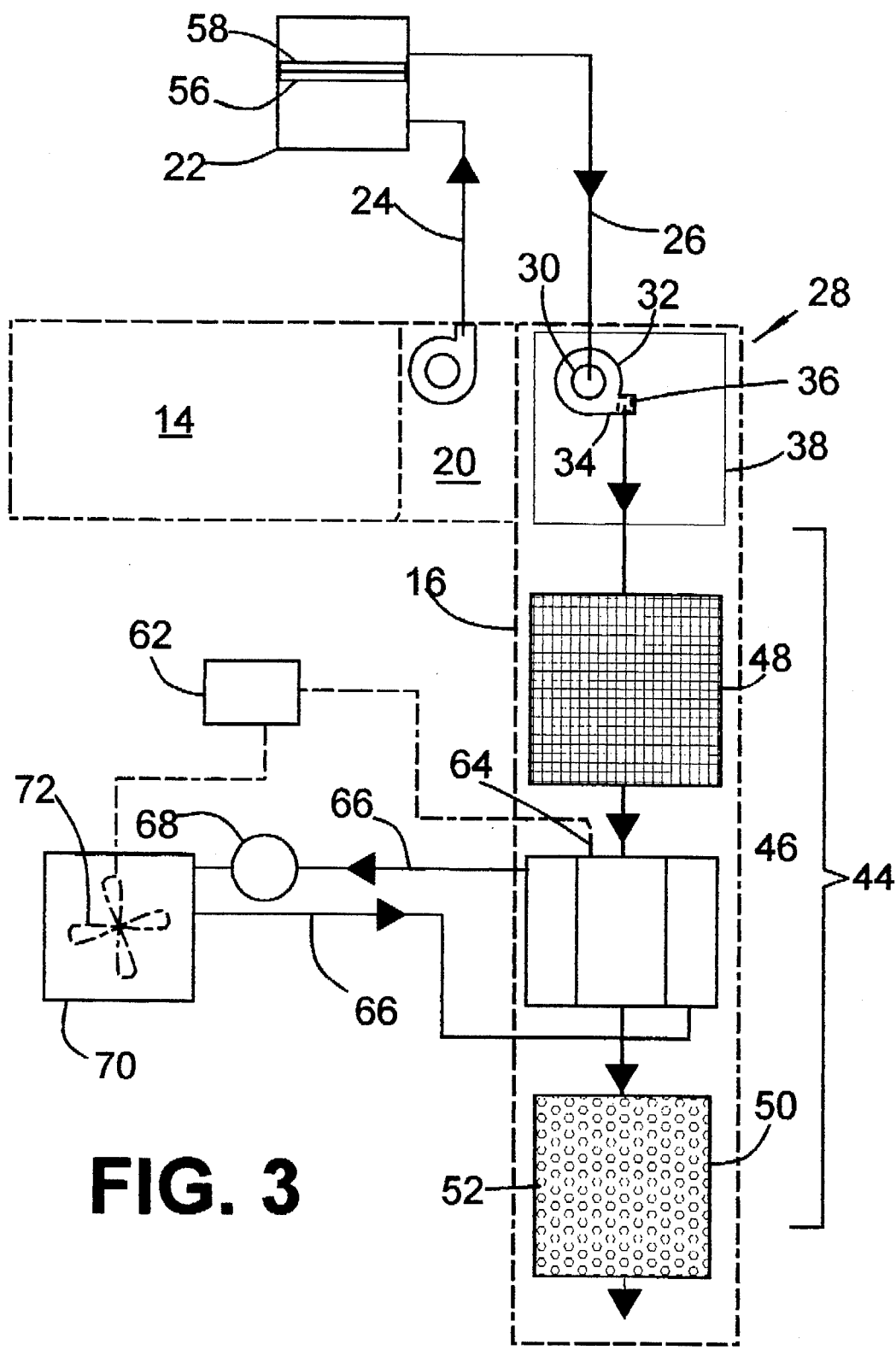
FIG. 3 represents a schematic diagram of the method of the present invention.

Referring to FIGS. 1, 2 and 3, a reflow soldering apparatus is generally identified as 10. The apparatus 10 usually includes a chamber 12 for maintaining a controlled soldering atmosphere. The controlled atmosphere usually is an inert gas such as nitrogen. At least one heated zone 14 and a cooling zone 16 are located along the direction of an article travel, depicted as the arrow 18.

The improved method of the present invention includes an exhaust zone 20 that is shown as being located between the heated zone 14 and the cooling zone 16. The exhaust zone 20 is in fluid communication with a first filter chamber 22 by way of first conduit 24. The first filter chamber 22 is in fluid communication with the cooling zone 16 by way of a second conduit 26. It is to be noted that the exhaust zone may be adjacent to the cooling zone and/or the heating zone. It is important to note that any gas being taken from a heating zone, alone, should be at a temperature at which filtration by the filter chamber 22 is effective.

Referring in particular to FIGS. 2 & 3, the discharge end of the second conduit 26 is in fluid communication with a low pressure portion 28 of the cooling zone 16. The suction port 30 of the centrifugal blowers 32 is in fluid communication with the low pressure portion 28. It is to be noted that multiple centrifugal blowers 32 have been depicted in FIG. 2. Only one centrifugal blower 32 or pumping means may be needed, if its capacity is sufficient for the application. The gas leaving a discharge port 34 of the blowers 32 is directed through its associated aperture 36. Each of the apertures 36 is formed in and through a contoured collection tray 38. It is preferred that the aperture 36 be smaller than the discharge port 34. It is also preferred that the aperture 36 and the discharge port 34 be in substantially axial alignment. It is also preferred that the periphery of the aperture 36 have vertical side walls or flanges 40 as well as edge walls or flanges 42. It has been found that the height of the flanges 42 in the neighborhood of 6.5 mm gives good results. This feature will be discussed below.

Each aperture 36 is in fluid communication with a high pressure zone 44, of the cooling zone 16. The high pressure zone 44 includes a cooling heat exchanger 46. A mesh filter 48 is positioned in the high pressure zone 44, immediately above the heat exchanger 46. It is preferred that this mesh filter 48 be of an interwoven metal mesh. At least one perforated plate 50 is positioned immediately below the heat exchanger 46. The apertures 52 of a first plate 50 should be offset from the apertures 52 of a second plate 50. It is preferred that the periphery of each of the plurality of perforations 52 be formed to provide a vertical flange or wall 54 that is a minimum of 1.8 mm. high. It has been found that perforations having a diameter in the neighborhood of 10 mm and uniformly spaced in the neighborhood of 25 mm on center, gives good results.

Referring in particular to FIG. 3, a gas containing a flux, mixed therein, is removed from the apparatus 10 by way of the exhaust zone 20. The gas/flux mixture is pumped from exhaust zone 20 through the conduit 24 to the first filter chamber 22. It is preferred that the gas/flux mixture flow through a fiberglass pre-filter 56 then subsequently through a High Efficiency Particulate filter 58, commonly known as a HEPA filter. The cleaner gas leaving the first filter chamber 22 is conducted to the low pressure portion 28 of the cooling zone 16, by way of conduit 26. The gas is then pumped to the high pressure portion 44 of the cooling zone by at least one blower 32. In some applications, some flux laden gas from the heated zone may infiltrate into the low pressure portion 28, resulting in a first residual condensate 60, as may be seen in FIG. 2. Any first residual flux condensate 60 that may precipitate on the conduit wall 62 will drip directly onto the contoured collection tray 38. Any first residual flux 60 will accumulate and be retained on the tray 38 by the flanges 40 and 42. Referring again to FIG. 3, the gas then flows through the mesh filter 48 before being tempered by the heat exchanger 46. In the case of presently known fluxes, the heat exchanger 46 is thermostatically controlled at a tempering temperature in the neighborhood of 60 degrees C. This thermostatic control may be provided by a temperature controller 62 and temperature sensor 64; a thermal switch; or the like. The closed loop circulation of a coolant/fluid mixture through the heat exchanger 46 and its associated conduits 66 is controlled by the activation of the pump 68. The coolant/fluid mixture is cooled by a second heat exchanger 70, that is exposed to ambient air. A fan 72 is selectively actuated to cool the second heat exchanger 70, in response to the selected set point on the temperature controller 62. Alternatively, the flow of the coolant/fluid mixture may be controlled by valves responding to the signal from the thermostatic control.

This temperature of 60 degrees C. has been found to provide a sufficient cooling of a soldered joint of a PC board while simultaneously minimizing the precipitation of presently known types of flux onto the exterior surfaces of the heat exchanger 46. It is anticipated that other tempering temperatures may be selected for various types of flux. If in the event that any flux is yet suspended in the cleaned gas, this second residual flux drips from the heat exchanger 46. The second residual flux will be collected and retained on the perforated plate or plates 50. The flanges 54 of the perforations 52, more clearly seen in FIG. 2, retain any second residual flux. Offsetting the perforations 52 of two plates 50 will minimize the dripping of the second residual flux onto the soldered article.

Directional terms such as "front", "back", "in", "out", downward, upper, lower and the like may have been used in the description. These terms are applicable to the embodiments shown and described in conjunction with the drawings. These terms are merely used for the purpose of description in connection with the drawings and do not necessarily apply to the position in which the present invention may be used.

While these particular embodiments of the present invention have been shown and described, it is to be understood that the invention is not limited thereto and protection is sought to the broadest extent that the prior art allows.

What is claimed is:

1. A method of minimizing a fouling, by flux, of an exterior surface of a heat exchanger for cooling a gas of a controlled atmosphere that is interior of a cooling zone of a reflow solder apparatus, comprising:

a) removing a gas containing a flux, mixed therein, from the reflow solder apparatus at an exhaust zone by way of a blower and conduit, the conduit being in fluid communication with the exhaust zone;

b) separating a major portion of the flux from the gas containing the flux by conducting the gas containing the flux from the exhaust zone to and through a first filter chamber;

c) conducting the gas exiting the first filter chamber to a low pressure portion of at least one blower housing of the cooling zone;

d) passing the gas exiting each blower housing through at least one aperture of a contoured collection tray, the contoured collection tray being arrayed for collecting any first residual flux condensate thereon, the first residual flux condensate being formed on the walls of the blower housing and dripping therefrom;

e) conducting the gas, exiting each aperture of the collection tray, through a second filter;

f) tempering the gas exiting from the second filter, by passing the gas through a first heat exchanger, the first heat exchanger being maintained at a tempering temperature, said tempering temperature being sufficient to allow a second residual flux condensate to drip from an exterior surface of the first heat exchanger, said tempering temperature simultaneously allowing solidification of a soldered joint of an article being transported through the cooling zone of a reflow solder apparatus; and g) passing the gas, that has been tempered by the first heat exchanger, through at least one perforated plate while simultaneously collecting any of the second residual flux condensate thereon.

2. A method as recited in claim 1 which includes the further step of controlling the tempering temperature of the first heat exchanger by pumping a coolant fluid therethrough.

3. A method as recited in claim 2 which includes the further step of pumping the coolant fluid through a recirculating cooling system, the recirculating cooling system includes a second heat exchanger that is thermostatically controlled.

4. A method as recited in claim 3 in which the step of conducting the gas through a first filter chamber includes the further step of passing the gas through a prefilter element then subsequently through a high efficiency filter element.

5. A method as recited in claim 4 which includes the further step of retaining the first residual flux condensate on the contoured collection tray by providing continuous vertical flanges around the periphery of each aperture.

6. A method as recited in claim 5 which includes the further step of retaining the second residual flux condensate on each perforated plate by providing continuous vertical flanges around the periphery of each of its through perforation.

7. A method as recited in claim 6 which includes the further step of passing the gas through a layer of interwoven metal mesh of the second filter.

8. A method as recited in claim 1 in which the step of conducting the gas through a first filter chamber includes the further step of passing the gas through a prefilter element then subsequently through a high efficiency filter element.

9. A method as recited in claim 1 which includes the further step of retaining the first residual flux condensate on the contoured collection tray by providing continuous vertical flanges around the periphery of each aperture.

10. A method as recited in claim 1 which includes the further step of retaining the second residual flux condensate on each perforated plate tray by providing continuous vertical flanges around the periphery of each of its through perforations.

11. A method as recited in claim 1 which includes the further step of passing the gas through a layer of interwoven metal mesh of the second filter.

* * * * *